United States Patent [19]

Coplan et al.

[11] Patent Number: 4,784,880

[45] Date of Patent: Nov. 15, 1988

[54] METHOD FOR MODIFYING ASYMMETRIC MEMBRANES BY ENDO-TREATING

[75] Inventors: Myron J. Coplan, Natick; R. Douglas Burchesky; Salvatore Giglia, both of Norwood, all of Mass.

[73] Assignee: Albany International Corp., Menands, N.Y.

[21] Appl. No.: 890,383

[22] Filed: Jul. 25, 1986

[51] Int. Cl.$^4$ .......................... B05D 3/04; B05D 5/00
[52] U.S. Cl. .................................... 427/245; 427/230; 427/246
[58] Field of Search ............... 427/245, 246, 243, 244, 427/230

[56] References Cited

U.S. PATENT DOCUMENTS

| | | | |
|---|---|---|---|
| 3,022,187 | 2/1962 | Eyraud et al. | 427/244 X |
| 3,524,755 | 8/1970 | Hochberg | 427/245 |
| 4,230,463 | 10/1980 | Henis et al. | 55/16 |

FOREIGN PATENT DOCUMENTS 0141793 5/1985 European Pat. Off.

Primary Examiner—Evan Lawrence
Attorney, Agent, or Firm—Kane, Dalsimer, Sullivan, Kurucz, Levy, Eisele and Richard

[57] ABSTRACT

A method of upgrading the selectively of a dry asymmetric permselective membrane comprising a porous barrier layer adjacent to a porous main body, where the barrier layer has an external obverse surface. The method comprises maintaining the barrier layer surface in a drying atmosphere while applying a wetting liquid which is not a solvent for the bulk of the membrane to the obverse surface to wet interstices of the bulk of the membrane, and drying the membrane by continuing the exposure of the external surface of the barrier layer to the drying atmosphere as the wetting liquid moves from the obverse surface through the membrane main body and the barrier layer.

12 Claims, 5 Drawing Sheets

METHOD FOR MODIFYING ASYMMETRIC MEMBRANES BY ENDO-TREATING

BACKGROUND OF THE INVENTION

I. Field of the Invention

This invention concerns a method of fabricating permselective membranes suitable for the separation of components of fluids. In one embodiment, the fabricated membrane may be in the form of a hollow fiber with a barrier layer on its external surface having the capacity for separation under applied pressure the components of a gaseous mixture such as air. In other embodiments the invention may be in the form of a hollow fiber having the capacity for separation under pressure the components of a liquid. In other embodiments, the invention may be in the form of tubes, flat sheets, spiral-wound, or pleated sheets.

II. Brief Description of the Prior Art

There is a very substantial technical and patent literature extant describing the presently known wide range of synthetic membrane types and methods of producing them. Extensive contemporary treatment of the field will be found in:

Kesting, R. E. - "Synthetic Polymeric Membranes Structural Perspective" - 2nd Ed., Wiley, N. Y. 1985.

Belfort, G. - "Synthetic Membrane Processes", Academic Press, Inc., Orlando, Fla., 1984.

Sourirajan, S., and Matsuura, T., - "Reverse Osmosis and Ultrafiltration" - ACS Symposium Series #281, American Chemical Society, Washington, D.C., 1985.

Lloyd, D. - "Materials Science of Synthetic Membranes", ACS Symposium Series #269, American Chemical Society, Washington, D.C., 1985.

Turbak, A. - "Synthetic Membranes" - 2 Vols., ACS Symposium Series #153, American Chemical Society, Washington, D.C., 1981.

Other material specifically relevant to the subject matter of this invention will be found in:

Cooper, A. R. (Ed.) "Ultrafiltration Membranes and Applications" Plenum Press, N.Y., 1979 (Chapter by Cabasso)

Cadotte, J. E. "Interfacial Thin-Film Composite Membranes" Symposium sponsored by Bend Research, Bend, Oreg. 1983.

Schwartz, H., et al - "Skin Layer Characterization of Anisotropic Membranes for Ultrafiltration", J. of Membrane Science, Elsevier Amsterdam, 1982.

Wrasidlo, W. & Mysels, J. - "The Structure and Some Properties of Graded Highly Asymmetrical Porous Membranes" - J. of Parenteral Science and Technology, Vol. 38, Jan.-Feb. 1986.

It is well known that three major factors determine functional effectiveness of a practical membrane: the chemical nature of the membrane polymer; the fine physical morphology of the membrane polymolecular structure; and gross configuration. Gross configuration is meant to note such geometric distinctions as are characterized by the generic terms—"flat sheet", "spiral wound", "tubular", "hollow fiber", etc. Fine physical morphology is meant to denote the qualitative and frequently quantitatively definable features of membrane architecture at the level of the dimensions of aggregates of a few dozen polymer molecules. Chemical factors of a membrane polymer is meant to denote the nature of the atoms comprising the polymer and the system of primary and secondary valence bonds by which they are linked.

It is generally agreed that both physical morphology and polymer chemistry play important roles in the mechanisms by which ions or single uncharged molecules of a fluid mixture are selectively sorbed and subsequently migrate through a membrane. It is also generally understood that the selectivity of a membrane, whether for gases or for molecules and ions in solution, or even for larger species such as colloidal particles, is a function of the membrane upstream surface to the depth of only a few molecular radii. Permeability, however, is a function of not only the membrane chemistry but the thickness of the selective layer as well as hydraulic resistance factors determined by the morphology of the entire membrane cross-section.

By way of illustrating the importance of polymer type on selectivity, the following table presents the values of permeability of oxygen, nitrogen and helium as reported by several authorities and normalized here for comparative purposes to what could be expected from a test on a perfect dense film $1\mu$ thick.

TABLE I

Permeability and Selectivity of $O_2$, $N_2$ and He in Several Polymers

| Polymer[a] | Reference | P/t*[b] | | | α | |
|---|---|---|---|---|---|---|
| | | $O_2$ | $N_2$ | He | $O_2/N_2$ | $He/N_2$ |
| CA | Kammermeyer | .018 | .003 | — | 5.9 | |
| CT | Toyobo | .015 | .0025 | — | 5.9 | |
| EC | Kammermeyer | .12 | .03 | — | 4.0 | |
| Si | Fr.1,379,288 | 7.0 | 3.1 | — | 2.2 | |
| PS | Erb & Paul | .017 | .003 | — | 5.8 | |
| CA | Gantzel & Merten | — | .003 | .29 | — | 95 |
| PS | US 4,230,463 | .018 | .003 | .09 | 6.0 | 30 |
| PS | UCC | .017 | .003 | — | 5.8 | 50 |
| PMMA | Chiou (U.Tex) | .0013 | .00016 | — | 8.0 | |

[a]CA is cellulose 2.7 acetate; CT is cellulose triacetate; EC is ethyl cellulose; Si is silicone rubber; PS is bis-A polysulfone (Udel-3500); PMMA is polymethylmethacrylate
[b]Expressed in units of cubic feet/sq.ft./day/psi$\Delta$P for a dense film with thickness, $t = 1\mu$ (10,000Å).

A review of the variable contributions of chemistry and morphology will be found in C. E. Reid and E. J. Breton (J. of App. Poly Sci., 1959, pp. 133-143). A more extensive discussion will be found in a chapter by P. Blais in a book edited by Sourirajan (Reverse Osmosis and Synthetic Membranes, 1977, National Research Council of Canada, Publication #15627, Ottawa). It is useful to consider some of the variations of morphology and to some extent the chemistry of existing membranes in order to establish the novelty of the present invention.

(a) The Fully Dense Morphology

The most elementary membrane morphology is that frequently called "fully dense". It is typified by cellulose nitrate cast "collodion" films. There may be subtle differences in the orientation and degree of order of the CN polymer molecules at the film surface vs. those in the bulk of the film. But, it is generally agreed that the film is esentially homogeneous, and fully dense from one face to the other. This morphology is attained, generally, by preparing solutions of the Polymer in volatile solvents, applying the solution to a support surface and allowing the solvent (s) to evaporate completely under conditions assuring the formation of an undisturbed deposit of the solute polymer. Fully dense membranes may also be formed by cooling shaped melts, and in some relatively exotic cases by condensation from the vapor phase.

Fully dense membranes have been made from cellulosic esters and ethers, vinyl polymers, polyamides, polyesters, polycarbonates, polysulfones, acrylics, polyethers, polyimides, polyimidazoles, silicones, polyolefins, and many others.

Selectivity (that is differential permeability) of such membranes either towards components of a gas mixture or toward the solvent and solutes of a solution has been heretofore considered to be almost entirely a function of the chemistry of the polymer. The permeation rate through a fully dense membrane however is not only a function of the polymer but would also be inversely proportional to the membrane thickness. The intrinsic permeability of a small molecule is itself determined both by the extent of its solubility in the polymer and the rate at which the dissolved molecules migrate under a potential gradient. That is, Intrinsic Permeability = Solubility (S) x Diffusivity (D) for a given thickness of membrane and a given differential of pressure or concentration across the membrane from its upstream to downstream surfaces.

The ability of a dense membrane to effect a separation between two small molecular species is, therefore, due to the differences in their individual values of S and D. The ratio of the products (SxD) is the selectivity (in the case of gases denoted as $\alpha$). That is:

$$\frac{(S \times D)_1}{(S \times D)_2} = \alpha \; 1 \; vs. \; 2$$

(b) Asymmetric Morphology

For any membrane polymer with attractive selectivity for a given separation, there arises the practical need to maximize permeability. Since flow resistance is a function of the permeation path length, it is clearly desirable to make the selectivity barrier as thin as possible. One early approach to this was the development of the so-called asymmetric or "anisotropic" membrane. Here there are at least two distinctly different morphologies present. A very thin selective barrier layer is found preferably at one surface. This layer may be fully dense for the case of separating small molecules or ions or have very fine pores for the case of separating larger molecules, colloids or the like. The bulk of the membrane thickness "has an open porous, granular or foraminous cellular texture. The skin provides the barrier suitable for selectivity, while the porous sublayer provides the mechanical or structural integrity for practical handling.

The methods for producing this bi-layered morphology are quite variable. Pioneering work was carried out at UCLA under McCutchan in the 1960's and one well-known method generally comprises the following steps. The membrane polymer is dissolved in a mixture of at least one volatile solvent and at least one other material. The latter may be a low volatility solvent for the polymer, or have at least partial miscibility with the essential polymer/volatile solvent solution. The proportions of the several ingredients of such a "dope" are generally in the range of Polymer (1)/solvent (2-5)/"other" (0.3-1). See for example the Loeb and Sourirajan formulas in U.S. Pat. No. 3,133,132 and in U.S. Pat. No. 3,567,810 to Baker.

In principle, the multi-component dope is cast out on a support surface or extruded as a sheet or hollow fiber, or the like. A period of time is allowed to elapse during which a certain amount of the volatile solvent is permitted or induced to evaporate from the exposed surface of the cast dope. During this step a skin of densified polymer solution forms. Subsequently, after a period which may only be a matter of seconds, up to as much as 5-10 minutes, the cast or extruded nascent membrane is brought into contact with a coagulating liquid - generally water. The water is viewed as capable of massively penetrating the formed skin layer without destroying it and thereby reaching the relatively dilute polymer solution beneath. The coagulant is miscible with the polymer solvent and upon reaching the solution beneath the skin desolvates the polymer and results in a heterogeneous precipitate of the parent polymer. The role of the third ingredient is to regulate and facilitate the formation of a controlled porous structure. In addition to coagulating the polymer the water extracts non-polymer ingredients of the original dope formula. post-treatments with heat and/or swelling agents may be applied to modify the skin (and bulk morphology).

A somewhat different mechanism for the generation of an anisotropic or asymmetric membrane is disclosed by Michaels in U.S. Pat. No. 3,615,024. While the dope formulation proportions are similar to those given above, the preferred solvents are all of relatively low volatility. After casting the dope on a support surface, no particular pains are taken to induce skin formation by partial evaporation of one solvent. The formation of a skin layer surmounting a porous substructure does occur, however, and is attributed to immediate and very rapid destabilization of the surface of the dope solution as a result of the immersion of the cast layer into a diluent. Consequently, at the dope-diluent interface the polymer precipitates in a fine-textured morphology. As diluent penetrates further into the dope, however, the coagulation proceeds more slowly leading to coarser texture. The resultant membrane is said to have a skin layer comprising a uniform fine-textured pore system having pores of dimensions of the order of 1 to 1000 millimicrons. One millimicron is 10 Angstrons, or about 3 times the dimensions of a single water molecule. U.S. Pat. No. 3,615,024 describes methods for initially forming these membranes as well as methods for heat annealing the as-formed membrane to reduce even these finest pores to the point of virtual elimination. However, for the most part the primary process is directed to membrane products suitable for ultrafiltration. Another example of skin formation without an explicit evaporation step is found in U.S. Pat. No. 4,454,085 to Schindler and Maier.

Still another variant of the mixed-solvent asymmetric fabrication approach and product are described by Kimura in U.S. Pat. No. 3,709,774. Here, a combination of a good high volatility solvent and a poor lower volatility solvent are used to dissolve a polymer. Dopes comprising about 20% polymer solids are cast on a support surface and a period of time at a selected temperature is allowed to pass to induce evaporation following which the cast nascent membrane material is immersed in a liquid leachant for the solvents. Depending on the variables there will be formed a finely-porous barrier layer or a fully-dense skin barrier layer surmounting a thicker sublayer having graded coarser pores.

Although less prevalent, there are also examples of the formation of an asymmetric morphology using a simple dope of polymer and one solvent. The process is characterized by similar steps to those described above, wherein a short period of solvent evaporation is permitted to induce skin formation, followed by immersion in a desolvation/coagulation liquid. See for example U.S. Pat. No. 4,209,307 to Leonard; U.S. Pat. No. 4,188,354 to Munari et al; U.S. Pat. No. 4,177,150 to Inoue et al.

In another variation, after partial evaporation of solvent, the skin so formed may be further modified such as by chemical, or radiation effects as illustrated by U.S. Pat. No. 4,456,708 to Wydeven or U.S. Pat. No. 4,451,424 to Tweddle et al.

Another approach to fabrication of an asymmetric membrane has been called "thermal gel extrusion". Examples are U.S. Pat. No. 3,745,202 to Riggleman and Cohen and U.S. Pat. No. 4,247,498 to Castro. Here a polymer forms a solution at fairly high concentrations (30% or more) in some fairly high boiling solvent or plasticizer at some elevated temperature. Upon cooling, the solution tends to destabilize and form into two phases, one rich in polymer, the other rich in plasticizer or solvent. Extraction of the latter phase leaves behind a porosified polymer matrix. If the original high temperature solution is cast or extruded into a gas environment there may be a tendency for skin formation to occur, so that after extraction of the plasticizer a discrimination in morphology will be found between the bulk of the material and its surface. The latter is rather fine-pored and more dense and may be further densified, after the extraction, by heat or solvent treatments.

Still another type of asymmetric membrane style and process are described by Kesting in U.S. Pat. No. 3,884,801; 4,048,271 and U.S. Pat. No. 4,333,972 and discussed in some detail in the Canadian National Research Council Publication #15627 referenced earlier. This method, in general, employs a combination of two (or more) volatilizable solvents and fairly dilute polymer solutions. The dope is cast and allowed to dry to complete evaporation of solvents, and without the interposition of a solvent-extraction stage. As the mixed solvent system dries out of the cast film there is formed, first, a surface layer of desolvated polymer aggregates having a relatively fine texture. Once this skin forms further evaporation occurs rather slowly and the slower desolvation of polymer in the remainder of the cast layer tends to create larger aggregates, with attendant larger connected interstices. By selective control of solvent mixture compositions, rates of evaporation, initial concentrations, etc., it is possible to prepare either highly asymmetric or virtually uniformly porous membranes by the described method.

There are many variations of the foregoing several general techniques but in principle they share the common objective of creating a multilayer structure comprising the same polymer. An external layer is formed in such a way that it ultimately will provide the desired selectivity, and may be only a fraction of a micron thick. The bulk of the membrane thickness which may be from 20 to 500 (or more) microns thick is a porous aggregation of the parent polymer. The selective layer may be itself porous until subjected to a heat or solvent treatment called annealing. With the appropriate original skin morphology, the annealed skin may have excellent selectivity even for such small molecules as oxygen and nitrogen, or for desalination of aqueous salt solutions. Absent annealing and with appropriate dopes and extrusion or casting conditions, the skin may be microporous with pore sizes suitable for selective separation of large dissolved molecules, colloids and the like by the processes of ultrafiltration and microfiltration.

c. Composite Membrane Morphology

A multilayer membrane in which a single polymer provides both the thin selectivity barrier as well as a mechanically adequate porous support is neither convenient to produce nor necessarily the ideal arrangement. It is more attractive from several points of view to provide, first, a non-selective porous support layer using a polymer particularly suited to that purpose and then create a barrier layer on one of its surfaces. The separately formed barrier layer is, with extremely rare exceptions, chemically dissimilar from the support layer.

Since the earliest efforts at preparing composite membranes were disclosed in the 1960's many approaches have been described. A review by Cadotte appearing in the ACS Symposium #269, referenced above, will be helpful in providing perspective. An early approach was directed to casting an extremely thin layer of cellulose acetate solution on a static water surface allowing drying to occur and then transferring the formed, dried ultrathin CA film to a porous backing. U.S. Pat. No. 3,580,841 to Cadotte exemplifies this approach.

This method was superseded by casting coating solutions directly onto porous support films. One example, U.S. Pat. No. 3,676,203 to Sachs and Riley entails the casting of an aqueous polyacrylic acid solution onto a pre-formed porous cellulose ester microfilter. A necessary feature of this general approach is that the solvent for the barrier layer polymer should not act deleteriously on the substrate. The choice of polyacrylic acid as a barrier layer on a porous cellulose ester support was dictated by this requirement for the coating solvent. Unfortunately the polyacrylic acid coating was washed off by aqueous feeds in reverse osmosis applications.

As an alternative Riley and his associates employed an expedient of protecting the substrate from the coating solvent by first coating a buffer layer on a CA porous support and then casting a dense barrier film of CA on top of the buffer. In one example water-soluble polyacrylic acid was the buffer. (Reference, Lonsdale and Podall "Reverse Osmosis Membrane Research", Plenum Press, 1972, New York).

However, the preponderance of coatings applied to microporous substrates have been selected (among other reasons) for their solubility in solvents relatively innocuous to the substrate. Examples will be found in U.S. Pat. No. 4,444,662 to Conover who applies silicones to microporous polypropylene; U.S. Pat No. 4,127,625 to Arisaka et al who coat cellulose acetate with ethyl cellulose, or silicone; U.S. Pat. No. 4,415,555 to Osei-Gyimah et al who cast acrylic copolymers onto polysulfone.

Klass and Landahl, in U.S. Pat. No. 3,616,607 propose a variant to this approach. A dense barrier layer of acrylonitrile polymer having excellent selectivity for gases but relatively low permeability is cast as a very thin film onto a silicone support layer. The latter however is not microporous but has a relatively high gas permeability even when not porous. Hence as a support for the polyacrylonitrile barrier, it afforded only minor additional resistance to flow.

Still another approach is given by Stancell and Spenser in U.S. Pat. No. 3,657,113. They describe the production of an ultra-thin dense barrier layer of deposited polymerizate formed from the plasma generated in a low pressure gaseous glow discharge. The support material taught therein may be either a porous or high permeability more or less dense polymeric material. Yasuda, on the other hand in U.S. Pat. No. 3,775,308 produces a composite by glow discharge plasma deposit onto a porous support including such diverse materials as polymers, porous glass, sintered metals and ceramics. The deposit of a barrier layer from a plasma has also been described in U.S. Pat. No. 4,147,745 and U.S. Pat. No. 4,272,378 to Sano et al and U.S. Pat. No. 4,268,662 to Tsutsui et al.

A broader general approach which has achieved considerable commercial success is the in situ formation of a barrier layer on a porous support by interfacial polymerization. A monomer soluble in water may first be imbibed into the porous polymer substrate and then the latter is exposed on one face to a non-aqueous solution of another monomer reactive with the first. U.S. Pat. No. 3,744,642 to Scala is one of the earliest disclosures of this method and entails the reaction of di-acid chlorides with diamines or di-hydroxy compounds. The general approach has been discussed in U.S. Pat. No. 4,039,440 and U.S. Pat. No. 4,277,344 both to Cadotte. A further variant involving polyfunctional amines and di-acid chloride is exemplified in 4,005,012 to Wrasidlo. A further variant is provided by Yaginuma in U.S. Pat. No. 4,244,817 who first coats polyamine onto microporous polysulfone and then insolubilizes the dried coating by a separate subsequent reaction with a di-acid chloride in solution. This approach is further elaborated in U.S. Pat. No. 4,353,802 to Hara et al.

Still another approach involves the catalyzed in situ polymerization of a single monomer. The best known example of this is the conversion of furfuryl alcohol into a condensation polymer under the influence of heat and acid as in U.S. Pat. No. 3,926,798 to Cadotte and widely known as NS-200 style.

An exception to the composite membrane in which a barrier layer of one polymer is supported on a microporous substrate of another is found in U.S. Pat. No. 4,440,643 to Makino. Here there is first prepared a polyamic acid polymer casting dope which is formed into a porous substrate and reacted at a suitable temperature and for a suitable time to convert the amic acid to polyimide. The latter is no longer soluble in solvents for polyamic acid, and the result is that the imidized substrate can be coated with a thin layer of polyamic acid which is then itself imidized by further heating.

A universal attribute of all the foregoing examples of composite mmbranes is that the selectivity function is provided by the thin polymeric film deposited in one way or the other on the porous substrate. The porous substrate, more often than not is already of an asymmetric morphology, as described above.

d. Occluded Asymmetric Morphology

An important new class of membrane is taught by Henis and Tripodi in U.S. Pat. No. 4,230,463. It has been described as a form of composite, but their approach is sufficiently different to justify distinguishing their product by the characterizing term: "occluded asymmetric". The thrust of U.S. Pat. No. 4,230,463 may be summarized as follows:

The selectivity of the polymer of an asymmetric membrane is often quite attractive when determined from an essentially perfect fully dense thin film. However, the exigencies entailed by the steps required to produce an ultrathin surface barrier layer surmounting a porous substructure are so constraining that such a barrier layer is frequently imperfect. Imperfections may be in the form of "pinholes" or have the character of a generalized state of inadequate densification. In either case, fluids applied under pressure against the purported selectivity barrier will tend to by-pass the more highly resistant perfect-skin regions and flow preferentially through the imperfections without selective separation of the components. That is, a substantial fraction of pressurized feed passes from the upstream face of the membrane to the downstream face without significant change of composition.

The solution to this taught by U.S. Pat. No. 4,230,463 is the method of plugging ("occluding") the skin layer imperfections by a material other than that comprising the parent polymer of the asymmetric membrane. Occlusion is accomplished by applying properly chosen materials to the external surface of the barrier layer. The occluding material is expected to penetrate to some extent into the imperfections or pores of the substrate, but not be of such low molecular weight as to be readily propelled completely through under pressure. Hence polymeric materials of suitable molecular weight are preferred. However, this occluding material, while plugging the imperfections of the barrier layer under many circumstances will also form a continuous external skin over the entire barrier layer.

One requirement for the occluding material, therefore, is that it have an intrinsically high permeability to the feed fluid, which will nevertheless be several orders of magnitude lower than the unblocked imperfection. The resistance to by-passing through imperfections afforded by the occluding material will thus be more than adequate even with a high permeability material. Any deficiency in selectivity of the occluding plug is often immaterial in the overall performance of the product inasmuch as consequent to occlusion, most transmembrane flow passes through the barrier layer of the substrate.

However, it is well-known that there is an inverse correlation between intrinsic selectivity and intrinsic permeability for virtually any separation barrier. In order to express the selectivity and permeability of the skin layer of the parent polymer, the material of the occlusive coating according to U.S. Pat. No. 4,230,463, must have high permeability and therefore will invariably have a poorer selectivity than that of the parent polymer.

As indicated, above, this situation is due to the inevitable formation of an additional skin layer from the occluding material. That is, if the plugging polymer is to wet out the defect areas it must also be expected to adhere as a skin over the perfect surfaces. A detailed discussion of the implications of this is given in an article authored by the inventors of U.S. Pat. No. 4,230,463 (Henis & Tripodi) in the Journal of Membrane Science, 1981, pp. 233–246.

A further elaboration of the occlusive coating technique is given by Ward et al in U.S. Pat. No. 4,214,020, which teaches that a formed bundle of hollow fiber membranes of the kind described in U.S. Pat. No. 4,230,463 may be coated by applying a coating solution to the external surfaces of the fibers. The method specifies that the coating is to be applied while "subjecting the hollow fibers to a pressure drop from the exterior to the interior of the hollow fibers while the bundle is immersed in the coating liquid."

The essential features and principles of the occluded asymmetric morphology are these:

1. the parent polymer of the asymmetric membrane has desirable selectivity;
2. an ultra-thin dense barrier layer free of imperfections or pores in an asymmetric structure cannot be achieved by the measures ordinarily practiced;
3. the pores in the barrier layer must be plugged with another material;
4. this is accomplished by applying a plugging material (generally a polymer in solution) to the external face of the barrier layer under the action of applied positive pressure to drive some of the plugging material into the pores;
5. the method inevitably also leaves a layer of the plugging material deposited on the non-porous areas of the barrier;
6. in consequence, it is necessary to employ a plugging material with intrinsic high permeability;
7. and materials of that quality inevitably have low intrinsic selectivity.

e. Topically Modified Asymmetric Morphology

It would be most attractive simply to "heal" closed the pores or imperfections of an asymmetric membrane. In the discussion of the essential principles of the asymmetric membrane approach given above under b) reference was made to post-treatments by heat and mild solvents or plasticizers. The essential thrust is that the pores of the skin layer, when there are any present, can be contracted by thermal or solvent activation of the polymer chains in the skin layer. The objective is to plasticize the molecular aggregates in such a way as to induce their spontaneous migration into denser networks without destroying the general features of the morphology. Examples of this include Boom who teaches in U.S. Pat. No. 3,737,042 the annealing of polybenzimidazole in ethylene glycol at 180° C., Inoue who teaches the treatment of polyacrylonitrile with aqueous non-solvent mixtures at 70° C. to 120° C. in U.S. Pat. No. 4,177,150.

Michaels in U.S. Pat. No. 3,615,024 teaches increasing the separation efficiency of an asymmetric membrane by post-treatments in liquids at elevated temperature. In the discussion of initial membrane formation this patent invokes the solubility parameter as a guide to solvent-polymer interactions as these pertain to the ultimate membrane morphology. Holladay et al in EP No. 0,141,793 teaches the treatment of preformed asymmetric membranes to upgrade their selectivity by contacting them with solvents whose solubility parameter lies "within about plus or minus 2 of the polymer material solubility parameter which comprises the asymmetric gas separation membrane".

The use of heat, solvents or combinations thereof can readily lead to uncontrolled and undesirable densification of the total membrane. Or, due to surface tension distributions can actually cause an increase of large pore dimensions, while causing the closure of small ones. The selection of a treating liquid on the basis that its solubility parameter lies close to that of the material of the membrane is a totally inadequate criterion to avoid these problems.

f. "Other" Known Morphologies

Besides the foregoing several categories of morphological style there are other known morphologies and methods for forming membranes. One such is the melt extrusion of a polymer in combination with a pore forming material which is subsequently eluted by solvent. Another morphology is formed by bombarding a fully dense membrane with penetrating radiation to form decomposition tracks in the polymer which are subsequently converted to channels by chemical reaction and dissolution. A third method contemplates the use of blowing agents in polymer melts to form porous extrudates. In these and perhaps other cases, the resultant membrane morphology is not generally that of a barrier layer comprising a fully dense or fine-pored texture surmounting a coarse-pored main portion. These are not therefore of interest in the present invention.

SUMMARY OF THE INVENTION

Notwithstanding the wide variety of membrane morphologies and treatments encompassed among the pertinent examples cited hereinabove it is believed that the present invention provides a novel and extremely attractive method for modifying the selectivity of the barrier layer of an asymmetric membrane in several alternative ways.

The present invention which is referred to as "endo-treating", (a term to be defined), entails the modification of the selectivity of an asymmetric membrane by a liquid treatment differing from any of those described above. It does not conform to the prior art methods of annealing of an asymmetric membrane, the coating of a typical composite, the "occlusive coating" method of U.S. Pat. No. 4,230,463 or the solvent treatment proposed by Holladay et al in EP No. 0,141,793.

In the method of the present invention a liquid is applied which is not a solvent for the bulk of the membrane, but is capable of wetting it, to the obverse side, not the barrier layer, of a dry asymmetric substantially nonselective membrane while maintaining the barrier layer side in a drying atmosphere. We have found that solubility parameter is a useless measure for selecting the liquid for the treatment. On the one hand, many whose solubility parameters lie within plus or minus 2 of the solubility parameter of the membrane polymer will quickly dissolve and destroy it completely. On the other hand we have employed liquids successfully in our process whose solubility parameters range from virtually identical to that of the polymer of the asymmetric membrane up to as much as 4 units greater than that of the membrane polymer. The treating liquid may be a very dilute solution of some polymer in a volatile solvent or mixture of solvents. It may also be a dilute solution or suspension of a chemical reagent or some inert non-polymeric material.

Before presenting a further detailed description of the invention the meaning of the expression "endo-treating" as used herein should be elucidated.

Liquid treatments heretofore described which are aimed either at perfecting an asymmetric barrier layer by annealing, or depositing a coating layer to form a composite, or introducing a plugging material to occlude imperfections rely on the application of a liquid to the barrier layer's exposed surface. The morphologies induced by these treatments are therefore the result of processes directed entirely or primarily at the exposed (ecto) surface of the barrier layer. By the subject method, which entails the introduction of liquid only to the obverse side of the asymmetric membrane while maintaining the barrier surface in a drying condition, the treatment processes are directed at the internal (endo) surface of the barrier layer. The meaning and distinctions contemplated by these terms will be better understood by reference to the figures, and the ensuing description.

DETAILED DESCRIPTION OF THE INVENTION

Figure 1:
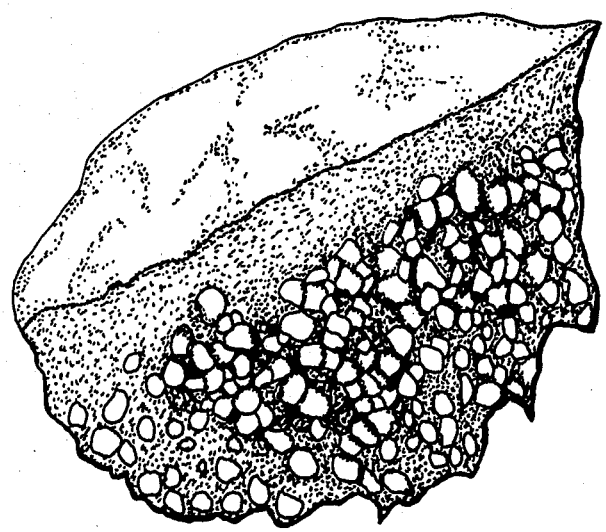
FIG. 1 is a drawing of a FIG. 8 micrograph showing an enlarged view at 10,000x of a partial oblique cross-section of an asymmetric hollow fiber membrane typical of those employed in this invention.
Figure 2:
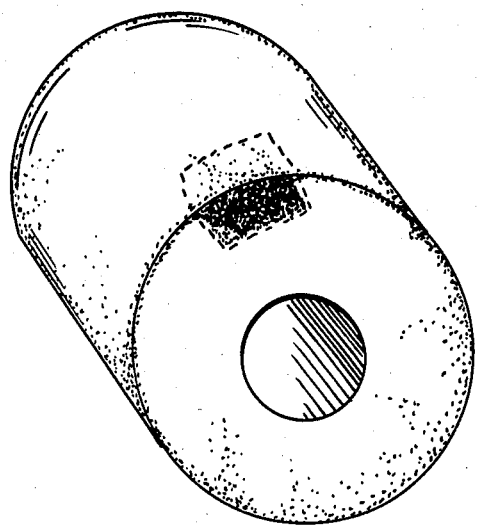
FIG. 2 is a drawing overlaying a copy of FIG. 1 indicating the region of the fiber cross-section shown in the photograph and illustrating the angle of view.

Comparison of FIGS. 1 and 2 will readily orient the viewer to the perspective in which the photomicrograph was taken. The finely mottled texture of the external surface of the hollow fiber on close examination indicates that there is a barrier layer about 0.2 $\mu$(2000Å) to 0.3 $\mu$(3000Å) thick consisting of nodules of the order of 200Å or less. These are quite densely packed, and the interstices they provide appear to be voids whose dimensions may be of the order of 10Å–50Å. The barrier layer merges into the main body of the membrane at a well defined boundary and the main body is clearly comprised of polymer nodules about 1000Å or greater in diameter. These are packed rather more loosely than the elements comprising the barrier layer, and it is fairly easy to define the interstitial dimensions as being in the order of 500Å to 1000Å.

Figure 3:
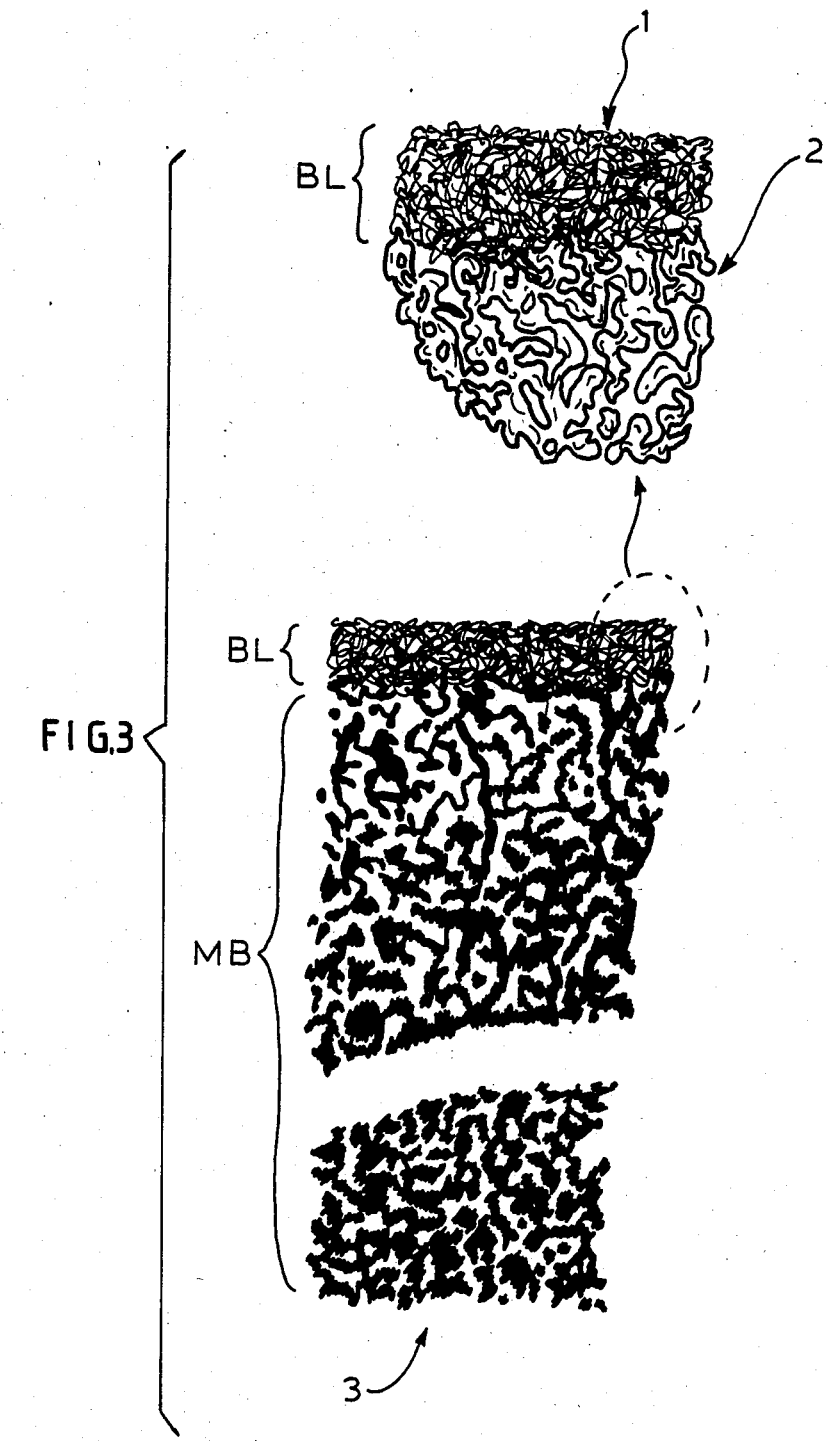
FIG. 3 is a drawing representing certain of the morphological features revealed in the photomicrograph of the asymmetric membrane.

These features are recapitulated in the non-oblique cross-sectional drawing of FIG. 3. The zone BL is clearly the barrier layer and is shown as about 1% to 5% porous and comprising heavily inter-diffused nodular elements about 1/10th the 3000Å thickness of BL. The zone MB is the main body of the membrane and to faithfully represent the actual situation of the fiber of FIG. 1 would be about 100 $\mu$ thick or about 300 times the thickness of the barrier layer.

The barrier layer exposed surface, 1, is herein called the ectosurface. The interface of the barrier layer, (BL), with the main body (MB), indicated by the numeral 2, is herein called the endo-surface. The obverse surface of the membrane is indicated by 3. In the case of the hollow fiber it faces into the bore.

Figure 4:
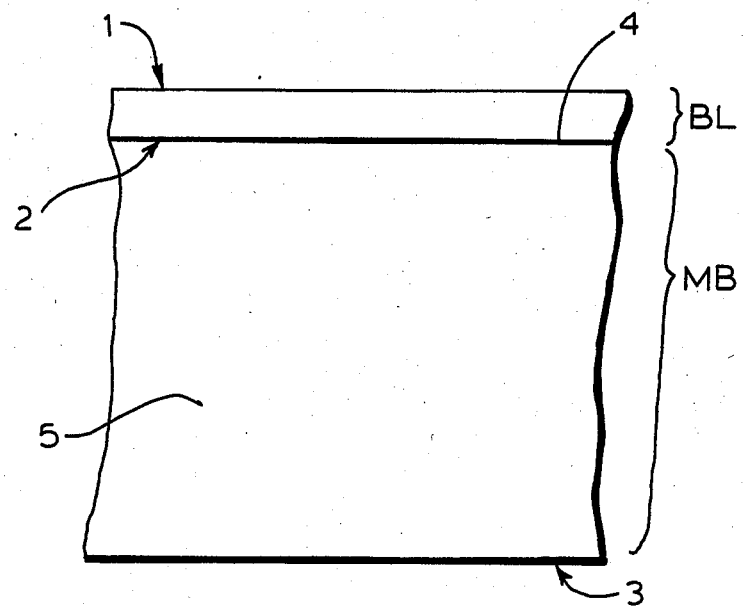
FIG. 4 is a diagrammatic representation, not to scale, of a cross-section through any asymmetric membrane.

FIG. 4 is a diagrammatic not-to-scale adaptation of FIG. 3 and the symbols BL, MB, 1,2, and 3 have the same meaning. The symbol 4 indicates a fine pore of the barrier layer, BL and symbol 5 indicates a coarse pore of the main body MB.

Figure 5C:
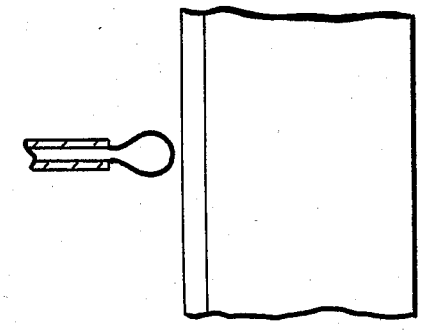
FIG. 5 illustrates how a wetting liquid dropped onto the barrier layer of an asymmetric membrane will spread and wet the barrier layer.
Figure 6C:
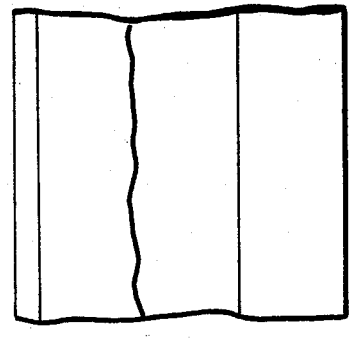
FIG. 6 illustrates how wetting would progress in an asymmetric membrane if the wetting liquid is applied to its obverse surface.
Figure 5B:
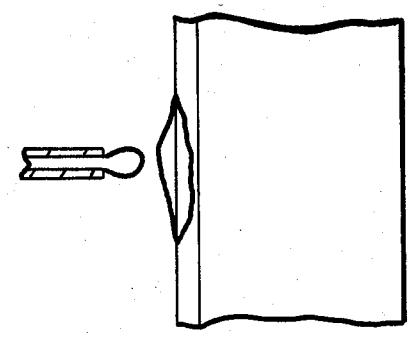
Figure 6B:
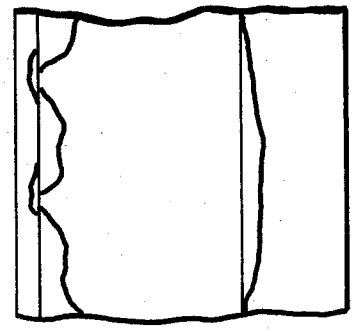

FIG. 5, a, b, c represent successive stages of how a wetting liquid when applied dropwise to the ecto-surface will absorb into and spread within the BL without penetrating into the MB. The first drop will quickly run out laterally over the ecto-surface while it is also drawn into the BL, as at 5b. At 5c the wetting out region has spread quite widely and pores of the BL directly under the source of drops have been entirely filled, while the pores of the MB remain dry. There may actually develop a small body of wetting liquid on the ecto-surface before the liquid penetrates below the endo-surface into the MB.

Figure 6A:
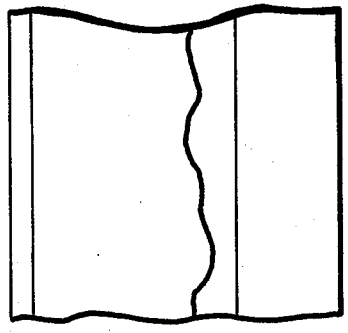

In FIG. 6a a continuous body of wetting liquid of finite volume has been brought into contact with the obverse surface and has started to migrate by capillarity toward the endo-surface. At 6b the supply of liquid at the obverse surface has begun to run out. The MB is virtually fully filled and in two places the capillary migration front has reached the endo-surface. Here the wetting liquid is rapidly drawn into the BL and starts to spread out. In 6c the capillarity of the BL is such that wetting liquid has been drawn into it even to the extent of partially relieving the pores of the MB of their burden of liquid.

Figure 7:
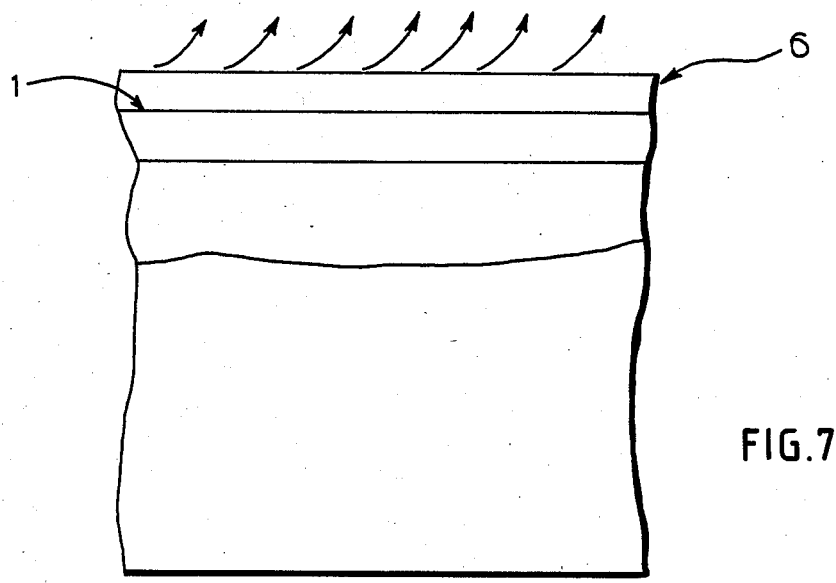
FIG. 7 is a diagrammatic representation of the condition existing during the drying step of a typical solution coating process used in the prior art methods of preparing a composite membrane.

FIG. 7 illustrates a stage associated with a typical coating process where a bulk layer of solution has been applied to the ecto-surface and has started to dry down. The coating solution has fully covered the ecto-surface. Liquid has fully penetrated the pores of the BL and to a certain extent may have been drawn or driven into the pores of the MB. If the coating solution consisted of a dissolved polymer it is very likely that at least a portion of solute would not penetrate the ectosurface. That is, even before drying begins there would have been a kind of ultrafiltration process whereby the solute would have been concentrated in the liquid film lying on the ecto-surface. As solvent evaporates (indicated by the curving arrows) the solute concentration will begin to build up at the film surface, and a thin skin, 6, may form. This will grow in thickness as the solvent continues to evaporate off of the film surface. In the case of a flat sheet, some solvent may also evaporate out of the obverse surface.

Figure 8:
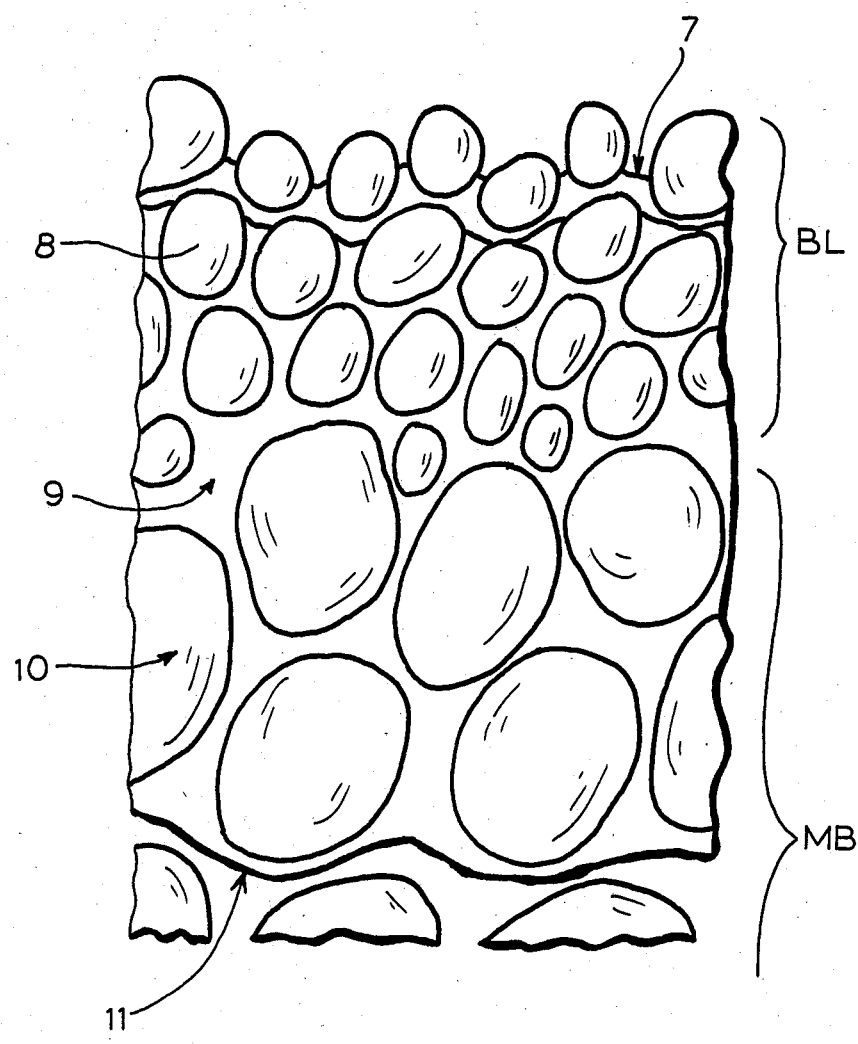
FIG. 8 is a diagrammatic representation at great enlargement indicating the drying condition typical of endo-treating by the procedures of this invention.

FIG. 8 represents an enlarged cross-sectional diagram illustrating a late stage of endo-treating with a dilute solution. A deposit of solute, 7, has started to build up near each pore mouth at the ectosurface. This deposit will grow inward and gradually fill the interstices among the nodules, 8, of the BL. Solution, 9, is shown as still present in the interstices among the nodules, 10, of the MB. A trailing edge of treating liquid at 11 is moving toward the BL drawn by capillarity to replace the volume of solvent evaporating at the ecto-surface. Eventually, when all the solvent has evaporated there will be left a band of BL nodules interlaced by a residual polymer deposit which is tightly locked into the parent polymer barrier layer.

As discussed above most practical separation membranes share certain morphological features. These are discussed with reference to a typical hollow fiber membrane, but the teachings are equally applicable to such other gross configurations as flat sheets, spiral wound sheets, pleated sheets, tubular membranes, and the like. Both the typical asymmetric membrane and the substrate of a composite will have a barrier surface which surmounts a coarse-pored main portion. The main portion and the barrier will be of the same polymer and the barrier may have either:

(a) a "perfect" fully dense structure, or
(b) an imperfect fully dense structure, or;
(c) a fine-pored texture.

These features are illustrated in FIGS. 1, 2 and 3. The barrier layer, 1, may be from under $0.1\mu$(1000 Å) to about $1\mu$ thick. If it is a fully dense polymer layer there are no microscopically detectable pores. The polymer chains comprising the layer are distributed between regions of higher and lower order and/or density, providing thereby "free volume" for the penetration of single small permeant molecules or small aggregates of permeant molecules, or hydrated ions.

An imperfect fully dense membrane may have gross defects or have a distribution of regions of low local density "frozen in" during the membrane forming process. The purpose of annealing is generally to release the polymer chains from the constraints imposed on them by their near-neighbors so that there will be the spontaneous development of a higher local density, and consequent elimination of some "free volume"

A fine-pored barrier layer may be about the same thickness as an ultrathin dense layer (i.e. $0.1\mu$ to $1.0\mu$) but is characterized by a fairly uniform distribution of nodular polymer aggregates having dimensions in the order of 200Å or less. FIG. 1, indicates such a barrier layer about $0.3\mu$ thick having fine-textured pores. The pores of the barrier layer are no greater than about 1/10th to 1/100th the layer thickness, hence they may be of the order of 30Å to 300Å and the barrier layer pores can be as small as 10–100Å.

The main body of the membrane is comprised of polymer nodules about $\frac{1}{3}$ the thickness of the barrier layer, and therefore about $0.1\mu$ or 1000Å in diameter in the example of FIG. 1. The interstices among these nodules are about the same size, namely 500–1000Å. The actual total thickness of the main (coarse-textured) portion of the membrane is of the order of $100\mu$ or about 300 times thicker than the barrier layer. These features and dimensions are indicated in FIG. 3.

The barrier layer has a well defined structure and may be considered to have two surfaces separated by several hundred to several thousand molecular radii. The external, exposed surface, the ecto-surface (marked 1 in all the figures) is distinguishable from the internal surface which corresponds to the boundary region between the barrier layer and the main coarse-pored body of the membrane (marked 2 in the figures). This internal boundary of the barrier layer is referred to hereinafter as the endo-surface.

As already noted, prior art practices of applying coatings or annealing liquids, bring these into contact with the ecto-surface. The method of the subject invention, wherein the treating liquid is applied to the obverse side of the membrane results in the contacting of the treating liquid with the endo-surface first, while the ecto-surface is kept in a drying environment. The liquids employed are not significant for their specific ability to swell or anneal the parent membrane polymer; they must, however, effectively wet the polymer.

It is well known that when a liquid is applied to a flat solid surface, the respective chemistries of the surface and the liquid will determine whether the liquid spreads over the solid—i.e. wets it—or forms discretely balled-up droplets. The wetting or non-wetting effect is also reflected in whether a liquid spontaneously migrates into the pores of a porous solid. The so-called "capillarity" determines the rapidity and extent of this spontaneous spreading of a wetting liquid into and within a porous solid body, and is a function of the pore sizes: the smaller the pore the higher the capillarity. Thus, it is a common experience that if a coarse-pored matrix and fine-pored matrix of the same solid material are held in contact with one another, the finer pored material, if dry, will tend to withdraw a wetting liquid from the coarser-pored material. But, the reverse is not true. That is, a dry coarse-pored surface will not have the capillarity to withdraw a wetting liquid from the pores of a finer pored surface.

Figure 5A:
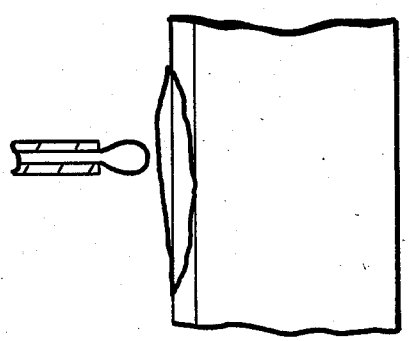

By way of example the condition which exists at the ecto surface of a dry asymmetric membrane is considered. If a drop of wetting liquid is applied to it the liquid will be more or less rapidly sorbed into the fine pores and spread out laterally within the barrier layer. But there will be little or no tendency for the liquid to flow into the coarser-pored regions unless there is a positive driving force. An applied hydraulic pressure could provide such a force. Under limited conditions, gravity could do likewise, provided the pores of the barrier layer have first been thoroughly wet out and there is a reservoir of liquid available on the outer surface of the barrier layer. These effects are illustrated in FIGS. 5a, b and c.

Now consider the condition obtaining at the back or obverse surface of an asymmetric membrane when a body of wetting liquid is applied to it. The liquid will tend to migrate through the coarse pores at some rate and for some distance until a liquid front reaches the endo-surface. At once the liquid becomes strongly attracted into the finer pores and will spread very efficiently within the barrier layer, withdrawing liquid from the coarse pores.

In the subject invention a continuous body of liquid under little or no pressure is supplied to the obverse side of the asymmetric membrane. The liquid migrates by capillarity first into the coarse-pored side and eventually reaches the finer-pored endo-surface where it tends to rapidly and completely fill these pores. However, the ecto surface of the barrier layer is never fully wet-out by any bulk deposit of liquid. Rather, the ecto-surface is maintained in a drying environment, so that liquid is induced to evaporate as it reaches each individual mouth of the multitude of pores lying in the ecto surface. These concurrent or sequential events determine that several potentially important processes are carried out effectively during the treatment that have not been possible or even recognized heretofore.

In one embodiment of the invention an asymmetric membrane having an imperfect barrier layer is endo-treated with a very dilute solution of a polymer other than that of the membrane (hereinafter "secondary" polymer) in a solvent which does not disturb the parent polymer of the membrane. During the endo-treatment there is continuous evaporation of the solvent at the individual pore mouths in the ecto-surface. As solvent leaves by evaporation the dissolved secondary polymer remains behind gradually becoming more and more concentrated at the pore-mouths. Capillary flow to the pore mouths will continue and offset back-diffusion or convective effects so that eventually the dissolved secondary polymer reaches a concentration that is high enough to pecipitate or otherwise be deposited. Quite possibly the solution at the mouths of some pores will reach this condition earlier than at others. This provides a self-leveling effect, since evaporation will slow down and even stop where the pore-closing precipitation or deposition has occurred while evaporation continues with attendant continued deposit of the dissolved polymer at the pores which are yet to be blocked.

Eventually all pore mouths become filled with precipitate of secondary polymer. Continued evaporation of solvent will merely build up the thickness of the pore-filling deposit from the underside and the top surface of the membrane will never have been wet by the dilute polymer solution.

At some appropriate time the supply of solution to the obverse side of the membrane is cut off. Drying is continued until the liquid imbibed in the pores of the main body of the membrane have emptied. Since evaporation is confined to the ecto-surface, solution will be continuously drawn from the coarse-pored substructure into the fine-pored barrier layer by capillarity until the assembly is entirely relieved of liquid.

It is important to realize, however, that the ecto-surface of the barrier will never have been wet out by the solution of dissolved secondary polymer, and the depth of the deposit of polymer in the pores is easily limited to at most the thickness of the barrier layer, or even a fraction thereof. All the pores will be filled essentially evenly due to the self-regulating effect of spontaneously controlled flow of polymer solution to the many discrete evaporation sites.

The result of the foregoing steps is superficially similar to some aspects of U.S. Pat. No. 4,230,463 but with extremely important differences. First, because in the present invention the ecto-surface of the barrier layer is never wet, there is no deposit of a film of the occluding polymer as an additional barrier on perfect regions of the ecto-surface. Thus a solute can be used in the liquid which is a secondary polymer of very low permeability. Indeed, the occluding material may well have no permeability. The selectivity of the material (polymer or non-polymer) may well be higher than that of the parent polymer and especially if it is a polymer of low permeability.

A second very important distinction of the subject invention is that the concentration of polymer in the treating liquid can be so low that it would ordinarily not be considered suitable for forming a film. A brief examination of some quantitative relationships is provided for a suitable understanding of this. First, it is generally observed, (see FIG. 1) that the pore volume and solid volumes comprising the main body region of the membrane are substantially equal. That is, irrespective of the relative sizes of the pores and nodules, the main body region is about 50% porous. By contrast, the texture of the barrier layer is such that it is from less than 1% to perhaps 5% occupied by pores. As indicated the thickness of the barrier layer is generally about 1/100 to 1/500 that of the main body. Assume that it is desired to fill completely with dry solute all the pores of the barrier layer, and that the only available material for that purpose is dissolved in a solution filling the pores of the main body. Capillary migration is expected to empty the coarse pores of their contained solution which is continuously to be concentrated in the barrier layer with solute deposited in the fine pores.

The volume concentration of solute in solvent required would be equal to the ratio of the absolute total pore volume of the barrier layer pores to that of the pores of the main body. At one extreme this ratio could be $$\frac{5\%}{50\%} \times \frac{1}{100} = .001, \text{ or } 0.1\%$$

At the other extreme this ratio could be $$\frac{1\%}{50\%} \times \frac{1}{500} = .00004, \text{ or } .004\%$$

In the practical cases one probably would not even want to fill the entire volume of barrier layer pores, provided all pores were effectively blocked at or near their mouths. Moreover, in a practical situation it is likely that when applying liquid to the obverse side of the membrane, there will be liquid available besides that soaked into the main body.

Specifically, in a preferred embodiment of the subject invention, a bundle of dried, untreated asymmetric hollow fibers is wound. One end of the bundle is potted into a plug of epoxy and slices are made in the plug to cut and expose open ends of the hollow fibers. The bundle is installed in a fixture, (which may be a typical pressure shell intended for ultimate service in a separation process). A drying gas stream is introduced through suitable connections so that it flows gently over the ecto surfaces of all the fibers in the bundle. A liquid conducting connection is made to the fixture to provide liquid to the cut fiber ends, and the conducting connection is filled by the treating liquid so that it may flow into the bores of the hollow fibers and be imbibed into the obverse side of the hollow fiber membranes. The source of liquid may be promptly removed or kept connected. In any event in addition to the imbibed liquid at least the contents of the bores of the fibers will also be available for the endo-treating. Depending upon the period of time in which evaporation is carried out before closing off the treating liquid source, there may well be additional liquid allowed to enter the bores after initial filling.

The concentration of polymer in the solution used for the endotreating process can be as low as 0.001% with extraordinary efficacy in upgrading the selectivity of the barrier layer. In the event there were leakage of solution onto the ecto-surface around the mouth of a pore the thickness of film which might form where it is not desired would be infinitesimal, possibly even only one or two molecules thick.

Besides the extremely low solution concentrations required, another remarkable attribute of the endo-treating process of this invention is the extremely small volume of treating solution actually consumed. For example consider a hollow fiber membrane bundle having a total ectosurface of 50 square meters. This is a very realistic size being attainable in a fiber bundle about 15 cm in diameter by 75 cm long. If the barrier layer is 1% porous and its thickness is $0.3\mu$, the total barrier layer Pore volume is about 0.1 cc. If about half of that volume of polymer is to be deposited from a 0.001% solution, about 6 to 10 liters would suffice.

The fact that such extremely low concentrations of polymer in such relatively modest volumes of treating liquid can be effective in providing sufficient pore-filling material to upgrade the selectivity of a barrier layer leads to another surprising embodiment of the subject invention. It has been found that under endo-treating conditions a volatile wetting liquid used alone (i.e. without any known amount of deliberately added secondary polymer), can upgrade the performance of a porous asymmetric membrane from virtually no selectivity to the expected selectivity of a perfect fully dense membrane. This unanticipated effect may have a number of possible explanations.

One possible explanation is that while the wetting liquid is not a solvent for the bulk of the membrane parent polymer, it may have the capacity to solvate minute amounts of some constituent of the parent membrane, bearing in mind that 0.001% of a deliberately formulated solution of secondary polymer is a sufficient concentration to accomplish the desired effect.

Realistic bulk polymer entities are known to comprise mixtures of chain molecules of essentially identical chemistry but with a considerable range of molecular weights. The lower molecular weight fractions are frequently more soluble under any circumstances than the larger molecular weight fractions. In addition, many bulk polymer entities may also comprise mixtures of molecules of slightly different chemistry. For example, the chain ends may be different chemical moieties from one molecular chain to another. In any event a smaller chain molecule will by necessity have a higher weight proportion of chain end moieties than the longer chain molecules. Thus, it is possible that some very small fraction of a bulk polymer entity might be soluble—perhaps to the extent of only 0.001%—in some liquid which is normally considered to be a non-solvent for the bulk polymer. The parent polymer itself, therefore could, conceivably, be the source of a sufficient solute concentration to provide the pore-mouth deposits hereinabove described as provided by a secondary polymer.

This particular explanation as to why the endo-treating process of this invention is successful using only a wetting liquid which is not a solvent for the membrane parent polymer may not be the only possible explanation. Another possible explanation might be as follows. Evaporation of a wetting liquid from a capillary exerts considerable contractive force on the the walls of the capillary. If the wetting liquid also had any ability to dissolve in, and slightly mobilize the polymer elements comprising the barrier layer pore walls it is possible that the evaporation process is responsible for the endo-treating effect which is experienced. That is, evaporation continues for some time under circumstances such that the treating liquid is continuously and uniformly supplied to all the evaporation sites at the pore mouths. The liquid is supplied from the endo-surface and there is no liquid film lying on the ecto-surface. If a liquid film of the wetting liquid were consistently present on the ecto-surface, evaporation would only transpire from the film's exposed surface and there would be no strong shrinkage forces acting at the individual pore mouths until the very end of the drying out process, and no significant contractive stresses could be evenly operative at all pore mouths.

Whatever the mechanism by which endo-treating with a volatile liquid free of depositable solute functions to upgrade selectivity, it is clearly not required that the solubility parameter (SP) of the liquid be within 2 units of the SP of the polymer of the asymmetric membrane. Examples are given below where successful endo-treatments of an asymmetric membrane of polysulfone whose SP is 10.8 have been achieved using wetting liquids whose SPs have been as high as 17.5. On the other hand, a wide range of liquids meeting the 10.8±2 SP criterion of EP No. 0,141,793 are powerful solvents for polysulfone. Table II lists some of these, which would damage an asymmetric polysulfone membrane beyond use if employed in endo-treating.

TABLE II

Solubility Parameters of solvents Capable of Damaging An Asymmetric Polysulfone Membrane by Endo-Treating

| Solvent | SP | Δ SP* | Solvent | SP | Δ SP* |
|---|---|---|---|---|---|
| Chloroform | 9.3 | −1.5 | DMAC | 10.8 | 0 |
| Trichlorethylene | 9.3 | −1.5 | Epichlorohydrin | 11.0 | +0.2 |
| Methyl acetate | 9.6 | −1.2 | m-cresol | 11.1 | +0.3 |
| Methylene chloride | 9.8 | −1.0 | Furfural | 11.2 | +0.4 |
| Acetone | 10.0 | −0.8 | NMP | 11.3 | +0.5 |
| Dichlorobenzene | 10.0 | −0.8 | DMSO | 12.0 | +1.2 |
| Aniline | 10.3 | −0.5 | Benzyl alcohol | 12.1 | +1.3 |
| Acetaldehyde | 10.3 | −0.5 | DMF | 12.1 | +1.3 |
| Methyl salicylate | 10.6 | −0.2 | Furfuryl alcohol | 12.5 | +1.7 |
| Pyridine | 10.7 | −0.1 | Butyrolactone | 12.6 | +1.8 |

*Difference of solvent SP from 10.8, the SP of polysulfone

Although the endo-processing liquid should not be capable of dissolving the bulk of the membrane polymer, the presence of a suitably migratable species in a prepared asymmetric membrane can be assured by deliberately utilizing a casting or extrusion dope consisting of a polymer or mixture of polymers chosen to have a small fraction of polymer or other substance known to be slightly soluble in the endo-treating liquid which will be dissolved, caused to migrate and redeposit at the barrier layer pore mouth.

In other embodiments of the endo processes, the treating liquid may carry as a depositable solute a relatively high molecular weight non-polymeric material, such as a dye. Or, the solute may be an inorganic salt such as copper or silver acetate which in high dilution is modestly soluble in certain polymer-wetting liquids. Upon evaporation of solvent and deposit of a precipitate at the pore mouths the deposit can eventually be converted to virtually totally insoluble species such as reduced metallic silver or copper oxide.

In another embodiment of the endo-treating process of this invention the wetting liquid may consist of two or more volatile liquids. One or more of these would be in fairly low concentration, (<50%) and would be less volatile than the major liquid component. The system of liquids should be miscible at low concentrations of the minor components, but may result in the formation of an insoluble liquid phase of the minor component(s) as the major liquid component evaporates at the pore mouths. As evaporation occurs the less volatile liquids thereby become more concentrated at and only at the pore mouths. The less volatile liquid may or may not phase out but if it has specific plasticizing capabilities for the parent polymer of the membrane it will eventually reach a concentration suitable to achieve that effect. In due course the feed to the obverse side of the membrane may be changed to foster the elimination of the minor concentration of latent plasticizer which may have accumulated. By continued operation of the feeding and evaporation of only the more volatile liquid the membrane will eventually be relieved of the less volatile liquid. Alternatively, any residual sorbed less-volatile liquid, after inducing the desired effect, can be extracted by washing the ecto-surface with an extracting solvent. It is a feature of the endo-process, however, that the less volatile ingredient never reaches a concentration in the main body of the membrane to disturb its morphology.

In still another embodiment the endo-treating liquid may consist of a volatile liquid and a very low concentration of a chemical reagent which at suitable elevated concentration is capable of modifying the parent polymer. For example, certain hydrocarbon liquids which are essentially inert to aromatic polymers are capable of dissolving strong sulfonating agents such as chlorsulfonic acid at low concentration. A liquid consisting of as little as 0.1% or less or chlorsulfonic acid can be used as feed to the obverse side of a sulfonatable asymmetric membrane. As the evaporation process proceeds at the pore mouths, the concentration of chlorsulfonic acid increases at the pore mouths to the point where the polymer at these sites is susceptible to sulfonation. The process can be continued until the pores in the barrier layer are locally rendered highly hydrophilic by the topical sulfonation of the molecules lying on the surfaces of the polymer nodules comprising the barrier layer. The sulfonated sites may be subsequently further modified by an ecto-surface process or by a second endo-treatment with a dilute solution in which the solute has a specific reactivity for the sulfonated sites.

In still another embodiment, the endo-treating liquid may contain finely divided suspended, non-volatile species which at very high dilution are mutually repulsive and therefore non-aggregated. Provided the suspended particles are small enough, say <50 Å and non-attractive to the polymer comprising the nodules of the main body of the membrane, they will be carried to the barrier layer pores by the endo-treatment and eventually deposit as dried-form dense aggregates; these aggregates may be left to perform the pore-blocking function alone, or there may be a secondary application of a dilute solution of another species of solute reactable with the first. In one example of this sub-variant, the first deposit may be finely divided alpha alumina, a known catalyst for certain polymerizations. After deposit of alumina in the porous structure of the barrier layer, a very dilute solution of, say furfural or furfuryl alcohol can be fed by a second endo-treating step so that the polymerizable dilute solute will be concentrated and polymerize at the sites where catalyst had been previously deposited.

Yet another embodiment of the invention can be employed which in some respects resembles the processes of Yaginuma in U.S. Pat. No. 4,244,817 or Hara in U.S. Pat. No. 4,353,802 mentioned in the discussion of composite membrane styles. In these two cases a first monomer is deposited from a solution applied to the ecto-surface, and dried. Then a second monomer, reactive with the first, is applied and caused to react with the first to form a film on the outside of the base membrane. The monomers must be separately soluble in immiscible solvents. The subject invention can employ a two-step endo-treating process using dilute solutions first of monomer A, then of monomer B. Once monomer A has been deposited and dried, the solution of B can be in either the same solvent used for A or an immiscible solvent. This process will result only in a pore-filling secondary resultant polymer rather than form an external film on the ecto surface.

It will be recognized, that any version of an endo-treating process or its variants can only be carried out on hollow fiber membranes after they have been cut to provide access to their bores. That is, if they have their barrier layer on the outside surface liquid can be fed to the obverse (interior) surface only from the bore. If the barrier layer is on the inside surface, the bore must be made accessible to some means of fostering evaporation. Thus, to employ the invention with respect to hollow fiber membranes it is most convenient to convert them first to the form of the bundle that would eventually have been produced anyway. Rather than representing any kind of a disadvantage, this in itself is really a major advancement over the prior art of bundle formation of hollow fiber membranes whether composite or asymmetric.

The uncoated asymmetric hollow fiber can be wound, potted and sliced without great concern for destroying the perfection of its external ultrathin barrier layer. This concern exists whether the barrier has been formed by the deposit of a secondary polymer film as in the normal composite membrane morphology, or is the surface of a typical one-polymer asymmetric morphology. When winding, potting and slicing the potted region of bundles of "finished" fibers, damage to the barrier surface is normally a constant concern. By use of any of the subject invention embodiments this concern is greatly diminished, since there is no ultrathin deposited skin of a composite on the one hand while on the other hand the endo-process inherently has the faculty of coping with many kinds of flaws that may be inadvertently inflicted on the barrier layer of an asymmetric membrane during winding, potting and slicing.

In the case of flat sheets, there is a choice between treating them as continuous lengths, as single cut sheets or in assembled systems such as pleated elements or spiral-wound units. There will be the same advantage in treating finished assemblies as has been offered for the case of hollow fibers. There may also be some advantages to treating continuous sheets, however. Since both surfaces of a single flat sheet are accessible one can readily adapt the endo-process to the treatment of a prepared asymmetric sheet. The barrier layer surface, as prescribed, is to be kept in a drying environment while a treating liquid is applied to the obverse side. This is simply enough accomplished in a more or less stationary arrangement for individual cut sheets. However, one can readily adapt the endo-treatment to a continuous process wherein asymmetric membrane is fed to a station which wets out the obverse side while the barrier surface is maintained dry and may be subsequently further dried in a continuous sequence.

Recognizing that specific aspects of the method of this invention may differ in detail with different liquids, parent polymers, and the particulars of asymmetric morphology and gross configuration it is nevertheless proposed that the endo-treatment processes which have been described and which will be illustrated by specific examples below have broad general utility. That is, the principles and techniques herein described for hollow fibers of a particular kind are appropriate for application to membranes of many other descriptions.

Indeed, the methods may also be employed in the perfection not only of polymeric but also of asymmetric metallic or ceramic membranes. These latter generally comprise a coarse-textured inorganic oxide particulate base structure supporting a finer inorganic oxide barrier layer and thus resemble the polymer membrane morphology hereinabove described as the subject for endo-processing. Many types of dilute solutions in wetting liquids of various kinds can be visualized as providing the endo-treating ingredients required to modify the selectivity of the asymmetric ceramic parent membranes. Colloidal or sol-form inorganic oxides in water may comprise one type of endo-treating liquid. Others might be organic solvent solutions of decomposable metallo-organic esters or aqueous dilute solutions of inorganic salts having thermally fugitive anions such as acetate. In addition to maintaining the barrier layer in a drying atmosphere there may be the need for eventually introducing a stream of high temperature fluid such as air or oxygen or other inert or reactive gas to effectuate final chemical changes desired of the endo-treatment. In the case of endo-treating porous sintered metallic membranes, endo-treating liquids could be in the nature of solutions frequently used for electroless plating.

As regards the organic polymer membranes, it is virtually impossible to enumerate the myriad variations of parent polymers, wetting but nondestructive liquids, potential dilute solutes and permutations of mixed solvent combinations that may be effective. Clearly, a practitioner of the art of membrane development could conceive of many individual cases differing in specifics from the examples given below but consistent with the essential teachings of the invention.

While various descriptive terms used herein will be unambiguously understood in the vast majority of instances to which they apply, a few situations should be specifically clarified. For the case of endo-treating hollow fibers, it is well known that the barrier surface may lie either on the outside of the fiber or the inside. Where it is on the outside, the "obverse surface" must clearly be the surface adjacent to the bore. Where the surface of the bore is to be the barrier layer, the outer surface of the fiber is its "obverse surface". However these relationships may be less obvious in the following situation.

Consider a cylindrical porous ceramic rod about 2 cm in diameter and 50 cm long having a large number of parallel cylindrical tubular passages traversing its length. Each such passage is defined by a concave cylindrical surface whose qualities are equivalent to those of the bore of an asymmetric hollow fiber with a barrier layer on its inner surface. The rod is to serve as a separatory device in the same sense as a bundle of hollow fibers with a pressurized fluid fed into the bores at one end and removed at the other. Permeate is to pass through the barrier layer of each passage into the surrounding porous matrix, join with permeates from other such passages and flow toward the rod's external pervious surface whence it exits. Whereas in the case of a bundle of hollow fibers each barrier layer (i.e. bore-side surface) has its own obverse surface (i.e. fiber outside), in the case of the multi-passage porous rod, the external surface of the rod is the sole and mutually shared "obverse surface" with respect to each of the individual barrier layers.

Consider another porous cylinder with an impervious external surface having cylindrical passages traversing its length. These passages are of two types arranged in a cross-sectional pattern in which the two passage types alternate. One such passage type is formed with a barrier layer on its concave cylindrical surface. The other passage type has no such feature. The barrier-layer passages are connected into a common manifolding system sealed apart from the non-barrier layer passages. Pressurized fluid is introduced into the barrier layer passages. Permeate traversing the barrier layers will migrate through the porous matrix toward and into nearby non-barrier layer passages and flow longitudinally in these passages out of the rod ends. In this instance there is clearly one set of barrier layers and one set of "obverse surfaces" but there is a sharing here which is dissimilar from both that of a fiber bundle and the case of the first porous cylinder. Other system geometries may be conceived, but a unifying principle underlies them all.

"Barrier layer" is the structure called upon to effect the separation of fluid components; "obverse surface" is the plane—cylindrical, flat, pleated, or otherwise spatially distorted—from which permeated fluid is expected to leave the bulk of the membrane during its operation.

Some further elucidation is appropriate relative to what constitutes the bulk of the membrane. In the case of hollow fibers there can be little ambiguity; the "bulk of the membrane" is the solids making up their entire cross-section. In many cases of flat sheets the situation is equally simple: the bulk of the membrane is simply the porous polymeric residue left after casting or extruding a dope formula and drying and/or extracting same. However, many flat sheet membranes are cast upon macroporous fibrous assemblies such as knitted or woven cloth or non-woven fibrous webs. The cast dope interpenetrates the fibrous support matrix to a certain extent. In due course, after solvent evaporation, coagulation, extraction, drying and the like there has been achieved a multilayer structure. A barrier layer will be presented by the polymer used in the casting dope at an air interface remote from the support web. The "obverse surface" may consist only of the fibers of the macroporous support upon which the dope had been cast or some physical mixture of such fibers and casting dope polymer. Immediately adjacent to the barrier layer there will be the typical porous morphology of an asymmetric membrane consisting of the casting dope polymer and this will grade into some coarser-textured structures where the casting dope polymer has partially interpenetrated the fibrous matrix onto which it had been cast. For the purposes of this invention the entire thickness from barrier layer to obverse surface is the "bulk of the membrane". References to use of a liquid for endo-treating which is capable of wetting but not dissolving the bulk of the membrane should be understood in this sense.

EXAMPLE I

Asymmetric hollow fiber membranes were prepared from a dope formula comprising Union Carbide Corporation Udel P3500, dimethyl formamide (DMF), and Triton X-100. This dope was extruded as a continuous yarn comprising 8 hollow filaments having outside diameters of $300\mu$ and inside diameters of $90\mu$. The extrudate passed first into an air gap and then into a coagulating bath of water. The coagulation process removed substantially all the DMF and virtually none of the Triton. The latter was extracted by washing the coagulated but water-wet fibers with several successive extractions of isopropyl alcohol to extract virtually all the Triton, dried and then annealed in a hot air oven at 170° C. The fiber produced by this process, when examined by cross-sectional microscopy revealed the morphology illustrated by FIG. 1. That is, there was an asymmetric condition in which a layer about $0.2$–$0.3\mu$ thick consisting of nodules as small as $<200$ Å with extremely fine internodular pores surmounted a main membrane body consisting of nodules about 1000 Å or greater and being about 50% in pore volume.

These filaments were wound, potted and then sliced to form a typical bundle asembly. When installed in a typical pressure shell and subjected to air pressure of 100 psi, the membrane selectivity, α, was 1, that is the air passed through the membrane virtually unchanged in concentration, at any stage cut. When tested against a $N_2$/He mixture at 1000 psi it also showed no selectivity. The absolute permeation to air, expressed as P/t (the units used in Table I) was 0.8 cubic feet/sq.ft./day/psi. This is about 250 times higher than would have been expected from a Perfect PS film 1μ thick, or 80 times higher than would have been expected for a perfect dense barrier layer 0.3μ thick.

It should be noted that the asymmetric membrane had been both in contact with a treating liquid meeting the solubility parameter criterion of Holladay (polysulfone S.P.=10.8, isopropyl alcohol S.P.=11.5), as well as subjected to heat annealing and nevertheless exhibited no selectivity.

EXAMPLE II

The hollow fibers of Example I were assembled into a bundle and installed in a pressure shell as in Example I. After being so installed, the permeate outlet fitting of the pressure shell was connected by tubing to a vessel containing a 0.001% solution of cellulose acetate in a mixed solvent consisting of 40 parts isopropyl alcohol/40 parts acetic acid/20 parts water. This solution was allowed to flow into the bores of the fibers while an air stream was passed through the module over the external surfaces of the fibers. The actual volume of solution leaving the supply vessel was monitored and it was observed that flow slowed down significantly in a matter of a few minutes with the transfer of only about 3 times as much liquid to the module inlet as would be required to fill the fiber bores and saturate the pores of the wall main portion.

The supply of endo-treating solution was cut off ½ hour after the start of flow and the supply vessel disconnected. Dry air continued to flow over the outside surfaces of the fibers for several hours until there was no detectable aroma of solvent leaving the module.

When tested against an air feed at 100 psi, this membrane exhibited a selectivity of oxygen over nitrogen of $\alpha=5.8$ and the permeability, the P/t for $O_2$ was significantly lower than that of the untreated fiber, namely 0.14 cubic feet/sq.ft./day/psi. Reference to Table I will indicate that the selectivity is that of either polysulfone or cellulose acetate. The P/t corresponds to that of a perfect dense film having a thickness, t, of 0.12μ or about ½ the depth of the 0.2μ to 0.3μ barrier layer of FIG. 1.

The selectivity of the endotreated fiber was then tested by subjecting the module to a feed of blended nitrogen and helium at 1000 psi and it exhibited an $\alpha=98$ for He/$N_2$ with a helium P/t of 1.5 cubic feet/sq.ft./day/psi This selectivity and helium permeability correspond to what can be expected of a perfect fully dense film of cellulose acetate having a thickness, t, of about 0.1μ.

EXAMPLE III

The treatment of Example II was applied to a module comprising fibers from a different spin-lot than those of Example I. Prior to endo-treating ifs selectivity for air was nil, that is $O_2/N_2$ $\alpha=1$, the fiber was slightly smaller in outside diameter, namely 260μ, but otherwise resembled the morphology of the fiber of Example I. After the endo-treatment of Example II this fiber exhibited an α for $O_2/N_2$ of 5.8 and P/t of $O_2$ of 0.14. Another sample of this fiber was endo-treated in the same way and exhibited an α for $O_2/N_2$ of 5.3 and a P/t of $O_2$ of 0.12.

EXAMPLE IV

The process of Example II was repeated on the fiber of Example I, except the feeding of endo-treating liquid was cut off after 1 minute. The treated module exhibited an $O_2/N_2$ α of 5.2 and an $O_2$ P/t of 0.15.

Examples II, III, and IV demonstrate that the process is highly reproducible from one sample to the next of the same fiber, and from one lot of fiber to another. Example IV demonstrates that prolonged feeding of endo-treating solution is not required. As for the performance of the endo-treated membrane as determined by the observed α towards air it is not possible to say whether the controlling influence on selectivity is the free surface of polysulfone or the deposit of cellulose acetate in the pores. However, on examination of the reported selectivities toward the He/$N_2$ mixture shown in Table I it is evident that the selectivity of the module of Example II is greater than that expected of polysulfone. One is led to conclude that the thinness of the cellulose acetate deposit and the inherent higher permeability to helium of CA vs PS produces a result in which permeation through the CA blocked pores may be dominating, despite the net low % of barrier surface encompassed by the pores.

EXAMPLE V

The fiber of Example I was subjected to an endo-treating procedure similar to that of Example II, except the concentratidn of cellulose acetate was 0.01%. When this module was tested against: a feed of 30% hydrogen and 70% nitrogen at 400 psi it exhibited a selectivity $\alpha=53$ for $H_2/N_2$ and a P/t for hydrogen of 1.5 cubic feet/sq.ft./day/psi. The permeability of hydrogen in a fully dense polymer film is normally expected to be about 80% of the permeability of helium, which would, therefore predict a helium P/t of about 1.8 cubic feet/sq.ft./day/psi and a helium/nitrogen $\alpha=65$ for the membrane of this Example.

A comparison of the testing results on Example II and Example V modules is interesting. First it should be noted that in Example II, the treatment employed 0.001% CA, while in Example V the concentration was ten times higher, 0.01% CA. The total volume of endo-treating solution consumed was about the same. In the case of Example II, the volume of dissolved CA in the amount of treating solution consumed would have been sufficient to create a deposit of dense dried-down CA only about 0.1μ thick in the pore structure of the barrier layer of PS. The volume of CA deposited in Example V however would have been sufficient to fill the entire pore system of the barrier layer (i.e. about 0.3μ) and leave over an amount to dry down and deposit in the main body of the membrane. However, considering the much larger interstices and much higher porosity of the main body, the amount of CA deposited in these interstices would have created virtually no additional barrier effect.

In Example II, a dense deposit of CA in each pore at a thickness of about 0.1μ would result in a situation in which the effective path for flow in the parent PS barrier would also be approximately only 0.1μ. Thus the barrier surface would resemble a mosaic of PS and CA of about equal thickness. Because the intrinsic selectivities and permeabilities to air for CA and PS are quite similar, the performance of the mosaic barrier would be indistinguishable from that of either a pure fully dense CA barrier or a pure fully dense PS barrier of the same thickness.

The relatively thinner deposit of CA in Example II vs. that of Example V and the relatively much higher permeation rate of either hydrogen or helium over oxygen would be expected to produce the result of having the CA selectivity dominate much more strongly in Example II as compared to Example V. Thus the helium/nitrogen $\alpha$ of 95 for Example II is essentially that expected of CA, while the $H_2$/nitrogen $\alpha$ of 53 for Example V is what would be expected of a mosaic of CA and PS.

The higher effective P/t in the Example V case may be accounted for by the fact that the test of Example II was conducted at 1000 psi, while that of Example V was conducted at 400 psi. It is well known that high pressures can induce compaction densification and thereby reduce the effective flow per unit of applied pressure. It is as though the value t in P/t has been increased.

EXAMPLE VI

A third spin-lot of fiber was prepared by a variation of the process of Example I. The fiber morphology resembled that of the previous examples except that the outside diameter was 260$\mu$ and the bore diameter was 95$\mu$. When formed into a bundle and tested against air it showed no selectivity (i.e. $\alpha=1$) at any stage cut and had an air P/t of 0.7. Several bundles were prepared and then endo-treated with a 0.1% solution of polymethylmethacrylate (i.v. 0.2) in 50/50 acetic acid/IPA. When tested against 100 psi air they exhibited the following results:

| $\alpha$ $O_2/N_2$ | P/t $O_2$ |
|---|---|
| 6.0 | .05 |
| 5.6 | .06 |
| 5.4 | .07 |
| 6.0 | .05 |
| 6.1 | .06 |
| 5.8 | .06 |

The concentration of the treating solution was such that the endo-treating process could be expected to leave the barrier layer pores plugged with PMMA. Table I indicates that $\alpha=8$ for $O_2/N_2$ for PMMA is substantially higher than that of PS and its $O_2$P/t is substantially lower. Essentially all permeation would therefore be through the PS and none through the PMMA-blocked pores. Indeed, the performance of the treated modules is what would be predicted for a perfect PS barrier 0.2$\mu$ to 0.3$\mu$ thick. The endo-treating process has evidently effectively blocked the pores without the formation of an adverse external film utilizing a solution of a polymer whose selectivity is higher than that of the polymer forming the asymmetric porous membrane.

EXAMPLE VII

In this example the fiber of Example I was endo-treated using only the mixture 40 parts acetic acid/40 parts IPA/20 parts $H_2O$ without any cellulose acetate as solute. When tested with 100 psi air the module exhibited an $O_2/N_2$ $\alpha$ of 3.5 and an $O_2$ P/t of 0.17.

EXAMPLE VIII

A second module made from the fiber of Example I was endo-treated the same as the module of Example VII, and tested the same way with the result of $O_2/N_2$ $\alpha$ of 4.2 and $O_2$ P/t of 0.12.

EXAMPLE IX

The process of Examples VII and VIII was repeated but using another spin-lot of fiber of the kind that was used for Example III. When tested as in Examples VII and VIII, this module exhibited $O_2/N_2$ $\alpha$ 5.0 and $O_2$ P/t 0.13.

The mixture of acetic acid, isopropyl alcohol and water used in endo-treating Examples VII, VIII and IX is evidently quite effective in converting the unselective barrier layer into a selective layer about as thick as was exhibited by samples endo-coated with a dilute solution of CA. However, the perfection of the barrier layer is somewhat more variable and poorer with respect to $\alpha$. It is not certain what the mechanism of the effect of this treating liquid is. But it is noteworthy that compositional solubility parameter of the treating liquid is 13.4. Given that the solubility parameter of the parent membrane polymer (PS) is 10.8, the difference of +2.6 units is a substantial departure from the limits defined by Holladay et al in EP No. 0,141,793.

EXAMPLE X

Fiber from a fourth spin-lot of fiber prepared by a slight variant of the process used for Example I was made into a module which against air had $\alpha=1$, P/t for air 0.8. It was endo-treated using only neat IPA. The amount of liquid consumed was 2 or 3 times greater than for the cases of endo-coating with dissolved polymer. When tested against 100 psi air the module exhibited $O_2/N_2$ $\alpha$5.5 and $O_2$ P/t 0.15.

EXAMPLE XI

Example X was repeated using a 50/50 mixture of IPA and methanol. The treated module exhibited $O_2/N_2$ $\alpha$6.0 and $O_2$ P/t 0.15. The compositional solubility parameter of the treating liquid was greater than 13.0.

EXAMPLE XII

Example X was repeated using neat methanol. The treated module exhibited $O_2/N_2$ $\alpha$5.0 and $O_2$ P/t 0.12. The solubility parameter of methanol is 14.5.

EXAMPLE XIII

Example X was repeated using a 50/50 solution of water and IPA. The treated module exhibited $O_2/N_2$ $\alpha$4.1 and $O_2$ P/t 0.18. The compositional solubility parameter of the treating liquid is 17.5.

EXAMPLE XIV

The fiber of Example III was endo-treated with a mixture of 7 parts nitromethane and 93 parts IPA. The result was $O_2/N_2$ $\alpha$4.1 and $O_2$ P/t 0.13.

EXAMPLE XV

The fiber of Example X was endo-treated with a mixture of 12.5 parts nitromethane and 87.5 parts IPA. Tested against 100 psi air the module showed $O_2/N_2$ $\alpha$4.1 and $O_2$ P/t 0.13. These results, like those of XII show a somewhat less than perfect blocking of the barrier layer. The module of Example XIII was also subjected to 400 psi He/N$_2$ mixture and in that test exhibited He/N$_2$ α37 and He P/t of 1.3. There being no barrier material other than polysulfone this selectivity is quite in line with what could be expected from Table I.

EXAMPLE XVI

A solution of copper phthalocyanine in 50/50 IPA/H$_2$O at a concentration not over 0.001% was used to endo-treat the fiber of Example X. The treating time was extended to 2 hours and the volume of liquid consumed was 2–3 times that used in the endocoating with 0.001% cellulose acetate. This module exhibited O$_2$/N$_2$ α4.0 and O$_2$ P/t of 0.11.

EXAMPLE XVII

A module similar to that of Example I was subjected to an endo-treating process using a solution comprising 0.1% chlorosulfonic acid in dry cyclohexane as the feed. After a period of feeding and drying, the source of feed was disconnected and air drying continued for several hours. When subjected to a 100 psi water feed, the module exhibited a 10-fold increase in permeability over that of a bundle of fibers prepared as in Example I.

Having fully disclosed our concepts for a novel and useful method of modifying the barrier layer properties of an uncoated asymmetric membrane and having illustrated these concepts by several examples, we claim:

1. The method of upgrading the selectivity of a dry asymmetric permselective membrane comprising a porous barrier layer adjacent to a porous main body, the barrier layer having an external surface and the main body having an external obverse surface, comprising:
    (a) a wetting liquid which is not a solvent for the bulk of the membrane to said obverse surface to wet interstices of the bulk of the membrane; and
    (b) drying the membrane by continuing the exposure of the external surface of the barrier layer to a drying atmosphere, the wetting liquid moving from said obverse surface through the membrane main body and the barrier layer.

2. The process of claim 1 in which the wetting liquid comprises a dilute solution of a polymer.

3. The process of claim 1 in which the wetting liquid has the capability to dissolve a minor fraction of the material comprising the asymmetric membrane.

4. The process of claim 1 in which the wetting liquid consists of two or more miscible liquids in such proportions that the more volatile components are in the majority and the less volatile components have a mild plasticizing action on the barrier layer.

5. The process of claim 1 in which the wetting liquid comprises a highly diluted suspension of colloidally dispersed species.

6. The process of claim 1 in which the wetting liquid comprises a dilute solution of high molecular weight dye.

7. The process of claim 1 in which the wetting liquid comprises a dilute solution of an inorganic salt.

8. The process of claim 1 in which the wetting liquid comprises a dilute solution of a reactive agent capable of chemically modifying the parent substance of the asymmetric membrane.

9. The process of claim 1 in which the dry asymmetric membrane is inorganic in nature.

10. The process of claim 2 in which the membrane is comprised of a polymer different from the polymer dissolved in the wetting solution.

11. The process of claim 3 in which the asymmetric membrane comprises a mixture of substances selected to provide a fraction which is soluble in the wetting liquid.

12. The process of claim 9 in which the wetting liquid is a dilute sol of an inorganic oxide.

* * * * *